(12) United States Patent
Reynov et al.

(10) Patent No.: US 8,315,254 B2
(45) Date of Patent: Nov. 20, 2012

(54) BANDWIDTH MANAGEMENT SWITCHING CARD

(75) Inventors: Boris Reynov, Cupertino, CA (US); Euan Mowat, San Francisco, CA (US); Venkata Penmetsa, Cupertino, CA (US); Shreeram Siddhaye, Sunnyvale, CA (US); Jack Kohn, Mountain View, CA (US); Dung Nguyen, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 302 days.

(21) Appl. No.: 12/635,174

(22) Filed: Dec. 10, 2009

(65) Prior Publication Data

US 2011/0142065 A1 Jun. 16, 2011

(51) Int. Cl.
*H04L 12/28* (2006.01)
*H04L 12/50* (2006.01)
*H04L 12/66* (2006.01)
*G06F 15/173* (2006.01)

(52) U.S. Cl. ............ 370/360; 370/395.21; 370/395.41; 370/401; 370/463; 370/468; 709/223; 709/226

(58) Field of Classification Search .................. 370/360, 370/395.21, 395.41, 401, 463, 468; 709/223, 709/226
See application file for complete search history.

(56) References Cited

U.S. PATENT DOCUMENTS

| | | | | |
|---|---|---|---|---|
| 6,631,134 B1 * | 10/2003 | Zadikian et al. | ......... | 370/395.21 |
| 6,954,463 B1 * | 10/2005 | Ma et al. | ....................... | 370/401 |
| 7,233,567 B1 * | 6/2007 | Li | ................................. | 370/217 |
| 7,283,517 B2 * | 10/2007 | Yan et al. | ....................... | 370/352 |
| 7,293,090 B1 * | 11/2007 | Saleh et al. | .................... | 709/226 |
| 7,336,604 B2 * | 2/2008 | Dong et al. | ..................... | 370/230 |
| 7,529,186 B2 * | 5/2009 | Smethurst et al. | ............ | 370/229 |
| 7,599,285 B2 * | 10/2009 | Zhou et al. | ..................... | 370/217 |
| 7,602,807 B2 * | 10/2009 | Zadikian et al. | .............. | 370/468 |
| 7,606,245 B2 * | 10/2009 | Ma et al. | ....................... | 370/401 |
| 7,697,525 B2 * | 4/2010 | Zelig et al. | ..................... | 370/390 |
| 7,757,033 B1 * | 7/2010 | Mehrotra et al. | ............. | 710/316 |
| 7,760,859 B2 * | 7/2010 | Matityahu et al. | .......... | 379/22.06 |
| 7,792,027 B2 * | 9/2010 | Tatar et al. | .................... | 370/230 |
| 7,809,009 B2 * | 10/2010 | Tatar et al. | .................... | 370/419 |
| 7,864,791 B2 * | 1/2011 | Tatar et al. | .................... | 370/419 |
| 2004/0160945 A1 * | 8/2004 | Dong et al. | .................... | 370/352 |
| 2004/0210688 A1 * | 10/2004 | Becker | ............................ | 710/58 |
| 2006/0013133 A1 * | 1/2006 | Peng et al. | ..................... | 370/230 |
| 2008/0240104 A1 * | 10/2008 | Villait et al. | ................... | 370/392 |
| 2010/0165877 A1 * | 7/2010 | Shukla et al. | ................. | 370/254 |

* cited by examiner

*Primary Examiner* — Alpus H Hsu

(74) *Attorney, Agent, or Firm* — Harrity & Harrity, LLP (57) ABSTRACT

A bandwidth management card includes a switch control unit and multiple ports connected to one or more line cards that are separate from the bandwidth management card. The bandwidth management card further includes at least one switch, and multiple network ports, where each of the multiple network ports is connected to a respective link to at least one external network. A first switch of the at least one switch receives instructions from the switch control unit, switches a first subset of the multiple network ports through to a first port of the multiple ports based on the received instructions, and switches a second subset of the multiple network ports through to a second port of the multiple ports based on the received first instructions.

20 Claims, 8 Drawing Sheets

BANDWIDTH MANAGEMENT SWITCHING CARD

BACKGROUND

Current networks typically include devices, such as routers, switches or gateways, which transfer or switch data from one or more sources to one or more destinations. A packet is one format of data in which encapsulated data can be transmitted through a network. A router is a switching device that receives packets containing a data payload and control information at input ports and, based on destination or other information included in the packets, may forward the packets through output ports to the destinations or intermediary destinations. Routers determine the proper output port for a particular packet by evaluating header information included in the packet.

Existing routers include forwarding engines for receiving and forwarding incoming packets to their intended destinations. To forward incoming packets from input port to an appropriate output port, routers may perform complex data manipulation actions. Such data manipulation actions may include storing and retrieving encapsulation data required for constructing outgoing packet headers and forwarding outgoing packets based on routing data accumulated using network routing protocols.

In network devices, such as, for example, routers, switches or integrated security service gateway systems, packets travel through multiple line cards (e.g., security service cards or input/output (I/O) line cards) while being processed during the packet forwarding process. Ingress I/O cards of the multiple line cards are typically the first service cards in the network device and egress I/O cards of the multiple line cards are typically the last service cards in the network device.

SUMMARY

In accordance with one embodiment, a bandwidth management card may include a switch control unit and a plurality of ports connected to one or more line cards that are separate from the bandwidth management card. The bandwidth management line card may further include at least one switch and a plurality of network ports, where each of the plurality of network ports is connected to a respective link to at least one external network. The first switch of the at least one switch may receive first instructions from the switch control unit, switch a first subset of the plurality of network ports through to a first port of the plurality of ports based on the received first instructions, and switch a second subset of the plurality of network ports through to a second port of the plurality of ports based on the received first instructions.

In another implementation, a method may include selecting, via a switch control unit, a first subset of a plurality of network ports of a bandwidth management card that is connected to one or more separate line cards; and selecting, via the switch control unit, a second subset of the plurality of network ports of the bandwidth management card, where the second subset of the plurality of network ports is different than the first subset of the plurality of network ports. The method may further include switching, via a switch, the selected first subset of the plurality of network ports through to a first port of the bandwidth management card, where the first port is connected to a first line card of the one or more separate line cards, and where the first subset of the plurality of network ports share available bandwidth associated with the first port. The method may also include switching, via the switch, the selected second subset of the plurality of network ports through to a second port of the bandwidth management card that is connected to a second line card of the one or more separate line cards, where the second subset of the plurality of network ports share available bandwidth associated with the second port.

In yet another implementation, a system that includes a bandwidth management card may further include means for selecting a first subset of a plurality of network ports of the bandwidth management card, where the bandwidth management card is connected to one or more separate line cards, and where each of the plurality of network ports connects to a respective link to at least one external network. The system may also include means for selecting a second subset of the plurality of network ports of the bandwidth management card, where the second subset of the plurality of network ports is different than the first subset of the plurality of network ports, and means for switching the first subset of the plurality of network ports through to a first port of the bandwidth management card, where the first port is connected to a first line card of the one or more separate line cards, and where the first subset of the plurality of network ports share available bandwidth associated with the first port. The system may additionally include means for switching the second subset of the plurality of network ports through to a second port of the bandwidth management card that is connected to a second line card of the one or more separate line cards, where the second subset of the plurality of network ports share available bandwidth associated with the second port.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein implement a bandwidth management line card that may be connected between network links, connected to an external network(s), and other line cards within a network device that may, for example, perform packet forwarding. The bandwidth management line card may permit selective allocation of channel bandwidth to the network links. In the bandwidth management line card described herein, one or more switches may selectively switch a set of network ports through to a port, of multiple ports, that connect to other line cards. By this switching, bandwidth may be selectively allocated to the network links connected to the network ports via the bandwidth management line card.

Exemplary Network Device

Figure 1:
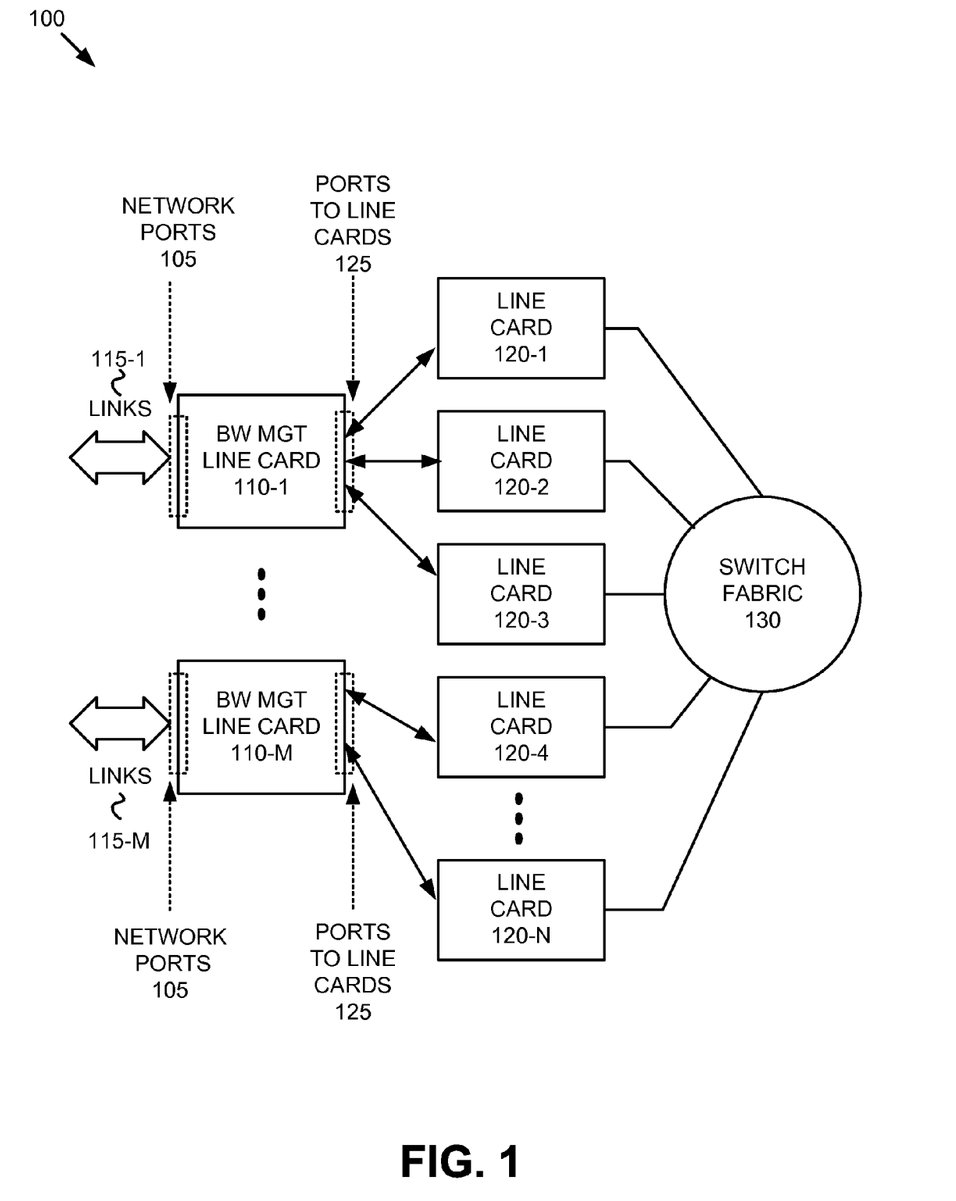
FIG. 1 is a diagram of an exemplary network device in which one or more bandwidth management cards may be used to allocate channel bandwidth over multiple network links.

FIG. 1 is a diagram of an exemplary network device 100 in which one or more bandwidth management cards may be used to allocate channel bandwidth over multiple network links. As shown in FIG. 1, network device 100 may include one or more bandwidth management line cards 110-1 through 110-M (generically referred to herein as "bandwidth management line card 110") interconnected via multiple ports to one or more other line cards 120-1 through 120-N (generically referred to herein as "line card 120"). Bandwidth management line cards 110-1 through 110-M may include multiple network ports 105 that connect to respective network links 115-1 through 115-M that further connect to one or more external networks (not shown). Bandwidth management line cards 110-1 through 110-M may further include ports 125 that connect to respective ones of line cards 120-1 through 120-N. As shown, each line card 120 may connect to switch fabric 130. Network device 100 may additionally include a routing engine (not shown).

Each of bandwidth management line cards 110-1 through 110-M may operate to switch certain ones of network ports 105 through to certain ports 125 connected to other line cards based on a specified switching configuration. For example, in one switching configuration, four of network ports 105 may be switched through to a single port 125 to another line card. In another exemplary switching configuration, ten of network ports 105 may be switched through to a single one of ports 125 that connect to another line card. Bandwidth management line cards 110-1 through 110-M may include switches (not shown) that permit selective switching of network ports 105 to ports 125 to control the bandwidth allocated to each of network ports 105. Bandwidth management line cards 110-1 through 110-M may receive data units via links 115-1 through 115-M and network ports 105 and may switch the data units through respective ones of ports 125 to line cards 120-1 through 120-N based on a currently implemented switching configuration.

Each line card 120-1 through 120-N, acting as an ingress line card, may receive data units from a respective bandwidth management line card 110 and may forward the received data units through switch fabric 130 to a respective line card 120, acting as an egress line card. Each line card 120-1 through 120-N may forward the received data units through switch fabric 130 using forwarding tables received from a routing engine. The routing engine may communicate with other of nodes in the external network(s) to exchange information regarding network topology. The routing engine may create routing tables based on the network topology information and forward the routing tables to each line card 120-1 through 120-N. The routing engine may also perform other general control and monitoring functions for network device 100.

Each line card 120-1 through 120-N, acting as an ingress line card, may receive data units from a respective bandwidth management line card 110 and may forward the received data units through switch fabric 130 to a respective line card 120, acting as an egress line card. Each line card 120-1 through 120-N may forward the received data units through switch fabric 130 using forwarding tables received from a routing engine. The routing engine may communicate with other of nodes in the external network(s) to exchange information regarding network topology. The routing engine may create routing tables based on the network topology information and forward the routing tables to each line card 120-1 through 120-N. The routing engine may also perform other general control and monitoring functions for network device 100.

Switch fabric 130 may include one or more switching planes to facilitate communication between ingress line cards 120 and egress line cards 120. In one exemplary implementation, each of the switching planes may include a three-stage switch of crossbar elements. Other types of switching planes may, however, be used in switch fabric 130. Egress line cards 120 may receive data units from switch fabric 130 and may forward the data units towards destinations in the network (e.g., a next hop destination) via a respective bandwidth management line card 110 and an outgoing one of links 115.

The components depicted in FIG. 1 are exemplary. Network device 100 may include fewer, additional, different and/or differently arranged components than are shown in FIG. 1. For example, network device 100 may include one or more intermediate service cards (not shown) that connect to switch fabric 130 and which may include special purpose cards that perform various specialized functions. For example, the intermediate service cards may include a firewall service card, an intrusion detection service card, an encryption/decryption service card, or other types of special purpose cards. Additionally, a component may perform tasks described herein as being performed by another component.

Exemplary Bandwidth Management Card

Figure 2:
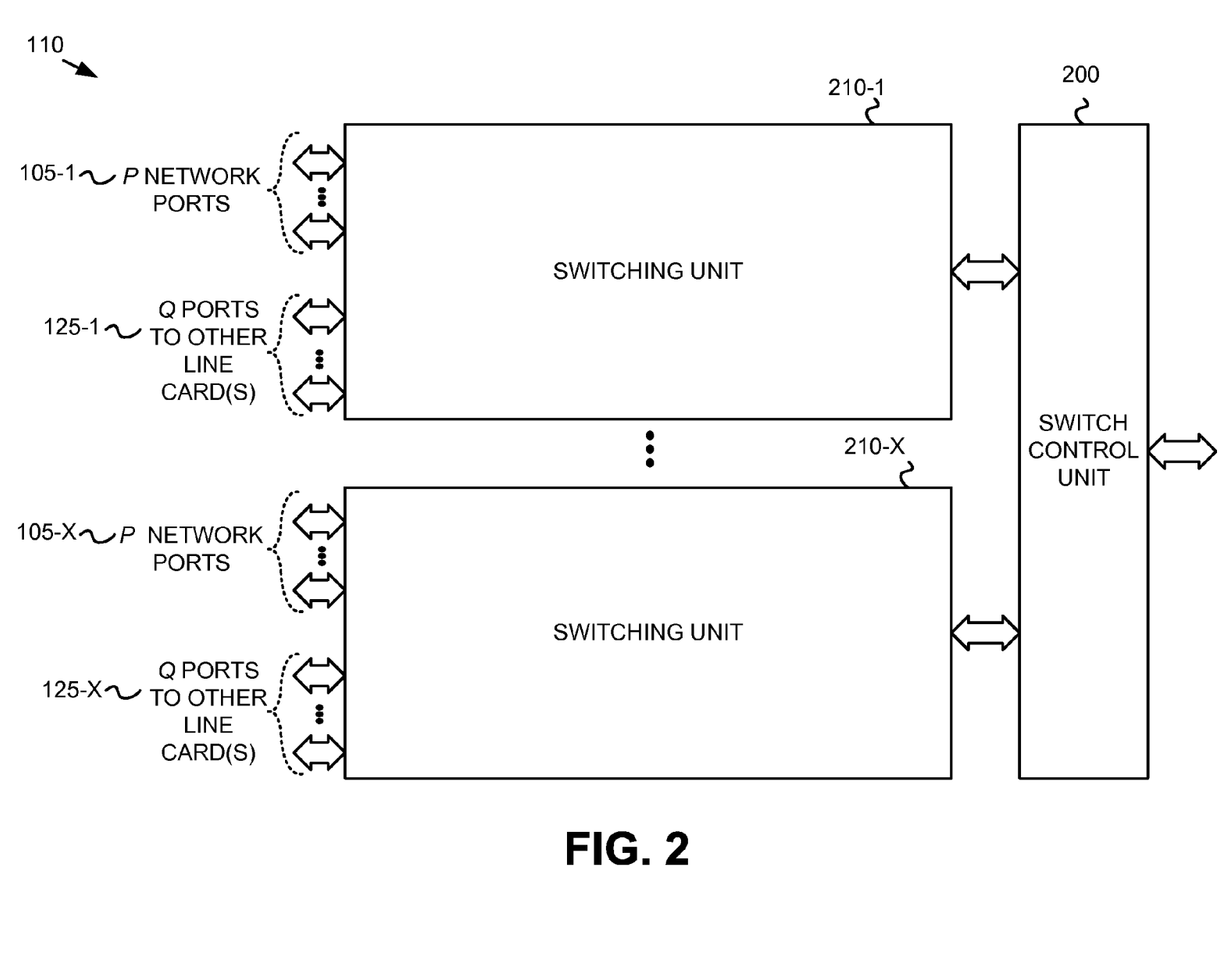
FIG. 2 is a diagram of exemplary components of a bandwidth management card of FIG. 1.

FIG. 2 is a diagram of exemplary components of a bandwidth management card 110 of FIG. 1. As shown, bandwidth management card 110 may include a switch control unit 200 and one or more switching units 210-1 through 210-X (generically referred to here as "switching unit 210"). Each of switching units 210 may have P network ports 105 connected to links that further connect to an external network(s), and Q ports 125 that connect to other line cards 120 in network device 100.

Each of switching units 210 may include a switch (not shown) that may selectively connect one or more subsets of network ports 105 through to a respective port of ports 125. Switch control unit 200 may issue instructions to switching units 210-1 through 210-X to control the selective switching of the connections between network ports 105 and ports to other line cards 125 so as to control a current switching configuration of switching units 210-1 through 210-X.

The components depicted in FIG. 2 are exemplary. Bandwidth management line card 110 may include fewer, additional, different and/or differently arranged components than are shown in FIG. 2.

Exemplary Bandwidth Management

Card Switching Unit

Figure 3:
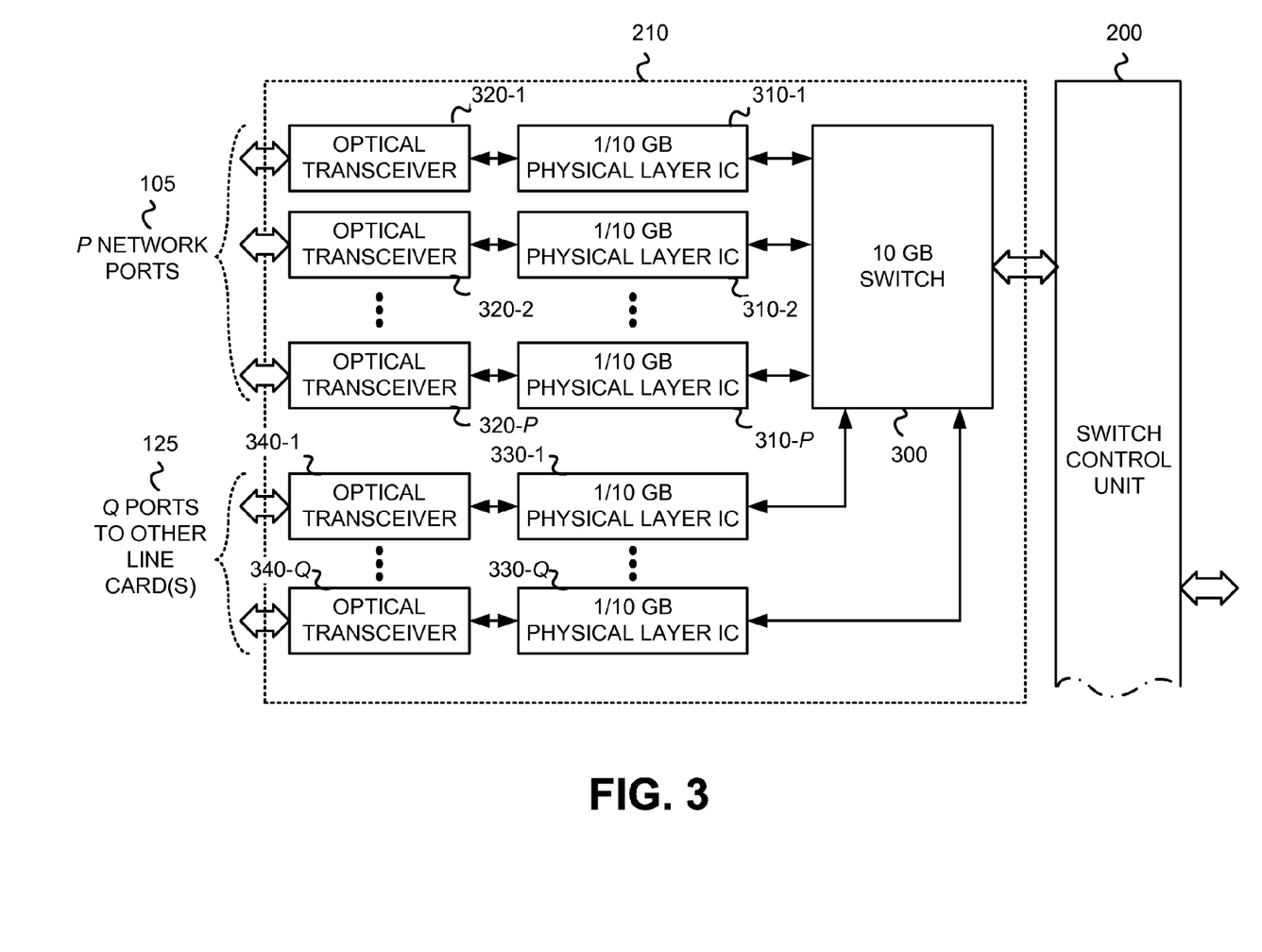
FIG. 3 is a diagram of exemplary components of a switching unit of FIG. 2.

FIG. 3 is a diagram of exemplary components of switching unit 210 of FIG. 2. As depicted, switching unit 210 may include a 10 Gigabit/second (Gb/s) switch 300 connected to P network ports 105 and to Q ports 125 to other line cards via respective ones of physical layer integrated circuits (ICs) 310-1 through 310-P (generically referred to herein as "PHY layer IC 310") and 330-1 through 330-Q (generically referred to herein as "PHY layer IC 310") and optical transceivers 320-1 through 320-P (generically referred to herein as "optical transceiver 320") and 340-1 through 340-Q (generically referred to herein as "optical transceiver 340").

Switch 300 may include a switching Application Specific Integrated Circuit (ASIC) that may selectively switch one or more subsets of network ports 105 through to a respective one of ports 125 to other line cards. In the exemplary implementation depicted in FIG. 3, switch 300 may switch data units at a maximum 10 Gb/s rate. In other implementations, switch 300 may switch data units at different maximum rates than 10 Gb/s.

Optical transceivers 320-1 through 320-P and optical transceivers 340-1 through 340-Q may each include circuitry for generating optical pulses for transmission over links 115 or for receiving optical pulses transmitted over links 115, where the optical pulses may be encoded with data corresponding to data units (i.e., by PHY layer ICs 310-1 through 310-P and 330-1 through 330-Q in the case of outgoing data).

PHY layer ICs 310-1 through 310-P may each include circuitry for decoding optical pulses received via optical transceivers 320-1 and for converting the optical pulses to digital data that may be sent to switch 300 for switching through to a respective port 125 to another line card. PHY layer ICS 310-1 through 310-P may also each include circuitry for receiving digital data from switch 300 and for encoding the digital data for transmission by optical transceivers 320-1 through 320-P as optical pulses. PHY layer ICs 310-1 through 310-P may each process data at one of multiple different rates. In one implementation, for example, PHY layer ICs 310-1 through 310-P may each process data at a 1 Gb/s rate. In another implementation, for example, PHY layer ICs 310-1 through 310-P may each process data at a 10 Gb/s rate.

PHY layer ICs 330-1 through 330-Q may include circuitry for decoding optical pulses received via optical transceivers 340-1 through 340-Q and for converting the optical pulses to digital data that may be sent to switch 300 for switching through to a respective network port 105. PHY layer ICs 330-1 through 330-Q may also include circuitry for receiving digital data from switch 300 and for encoding the digital data for transmission by optical transceivers 340-1 through 340-Q. In one implementation, for example, PHY layer ICs 330-1 through 330-Q may each process data at a 1 Gb/s rate. In another implementation, for example, PHY layer ICs 330-1 through 330-Q may each process data at a 10 Gb/s rate.

The components depicted in FIG. 3 are exemplary. Switching unit 210 may include fewer, additional, different and/or differently arranged components than are shown in FIG. 3.

Bandwidth Management Card

Network Port Switching Examples

Figure 4:
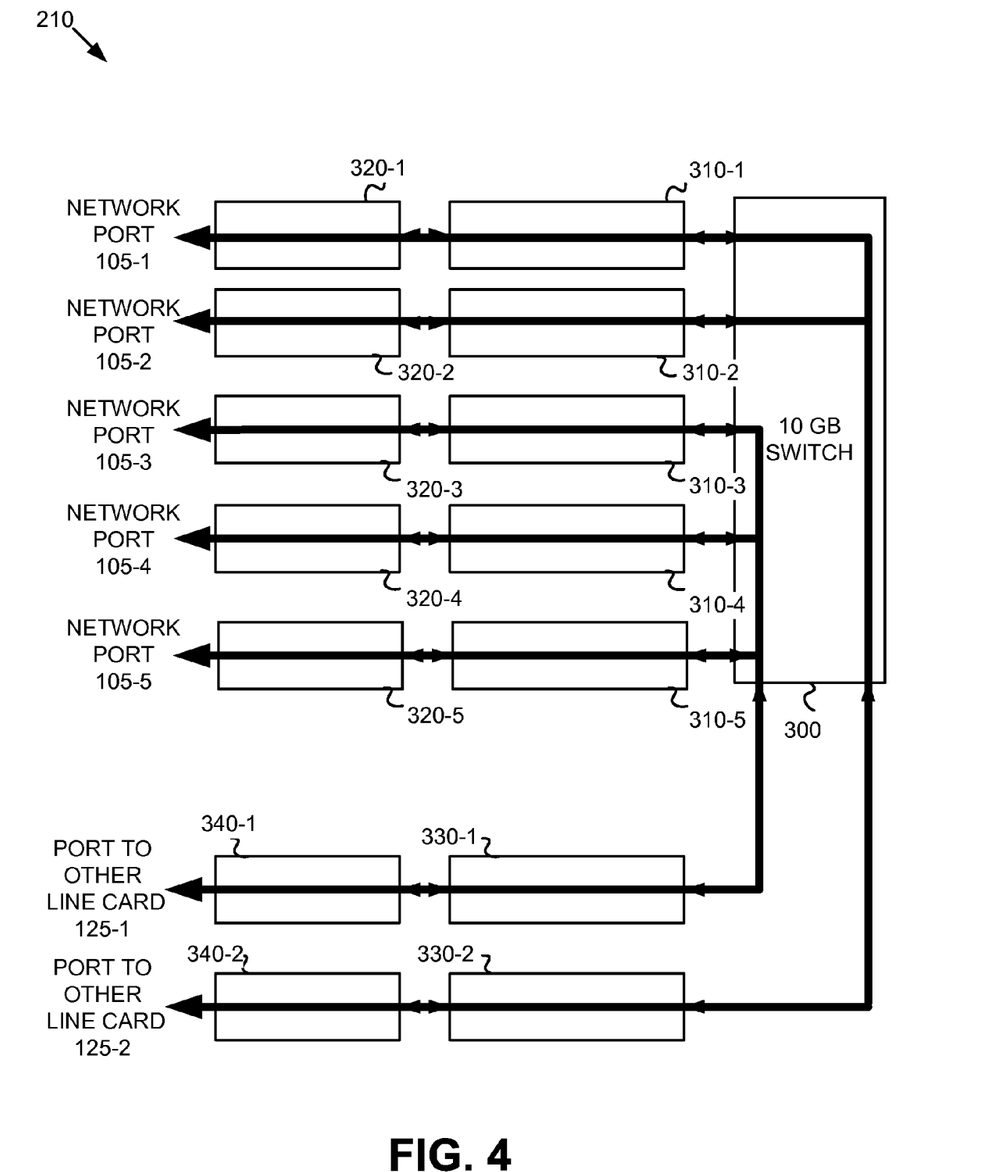
FIG. 4 is a diagram that depicts an example of the switch of FIG. 3 switching network ports of the bandwidth management card through to ports connecting to other line cards so as to allocate bandwidth to corresponding network links.

FIG. 4 is a diagram that depicts one example of switching unit 210 of FIG. 3 switching network ports 105 of bandwidth management card 110 through to ports 125 connecting to other line cards so as to allocate bandwidth to corresponding network links. In the example of FIG. 4, switch 300 may switch network ports 105-1 and 105-2 through to port 125-2. Switch 300 may further switch network ports 105-3, 105-4 and 105-5 through to port 125-1. In the exemplary implementation depicted in FIG. 4, switch 300 may have a capacity to switch data at a 10 Gb/s rate and PHY layer ICs 330-1 and 330-2 may handle data at a 10 Gb/s rate. Therefore, in the exemplary implementation depicted in FIG. 4, network ports 105-1 and 105-2 may only transmit/receive data at a 10 Gb/s combined rate (i.e., share 10 Gb/s of bandwidth between them). Furthermore, in the exemplary implementation depicted in FIG. 4, network ports 105-3, 105-4 and 105-5 may only transmit/receive data at a 10 Gb/s combined rate (i.e., share 10 Gb/s of bandwidth between the three network ports).

Figure 5:
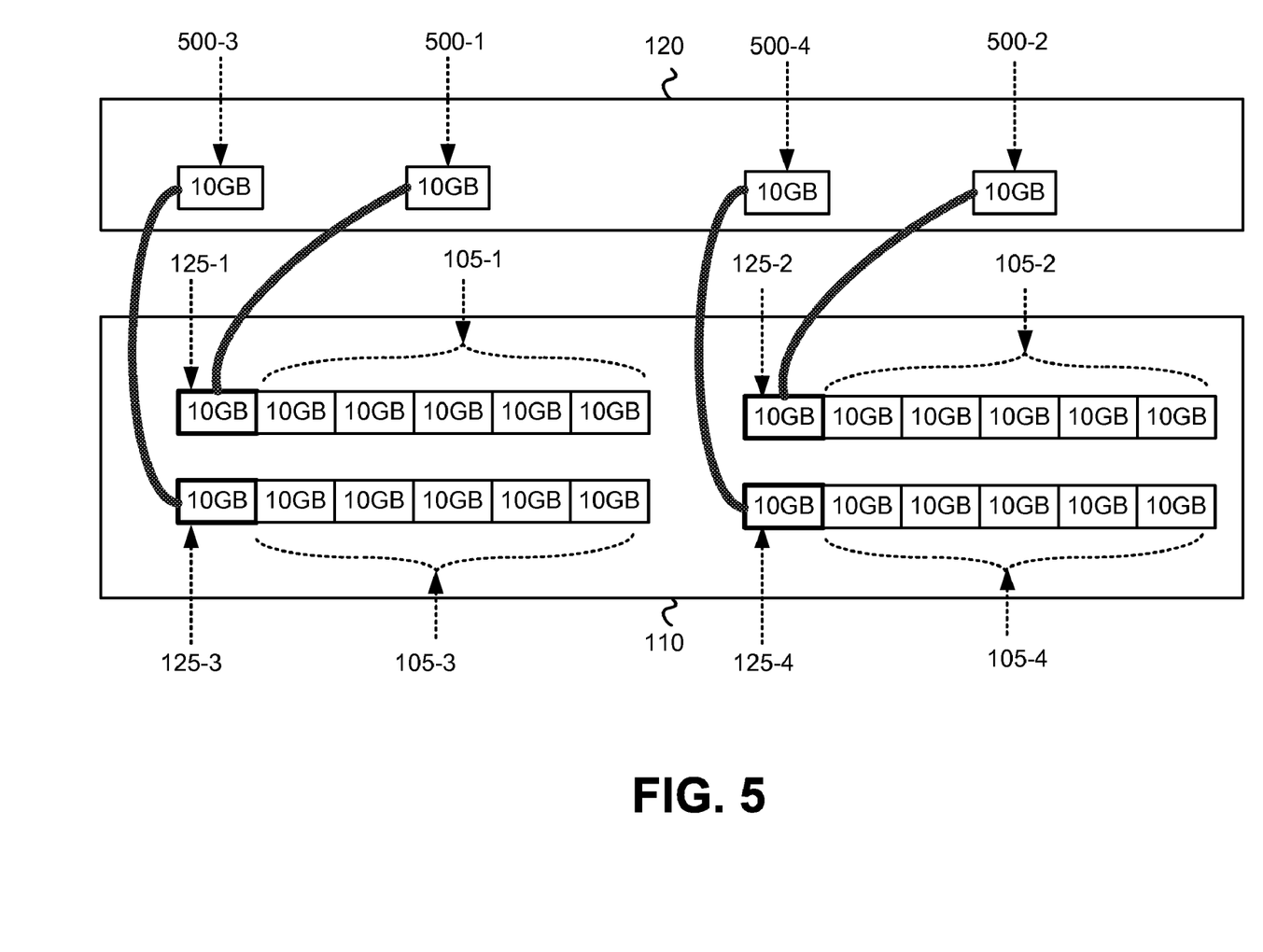
FIG. 5 is a diagram that depicts an example of four 10 Gigabit/second ports connecting to another line card, with five 10 Gigabit/second network ports being allocated to each of the four 10 Gigabit/second ports connected to the other line card.

FIG. 5 is a diagram that depicts another example of the switching of network ports 105 of bandwidth management card 110 through to ports 125 connected to another line card. In the example of FIG. 5, a first set of network ports 105-1 is switched (i.e., via switch 300) to a port 125-1 that is connected to a port 500-1 on line card 120. As shown, each of network ports 105-1 may have a 10 Gb/s maximum bandwidth, and port 125-1 may have a 10 Gb/s maximum bandwidth. A second set of network ports 105-2 is switched (i.e., via switch 300) to a port 125-2 that is connected to a port 500-2 on line card 120. As shown, each of network ports 105-2 may have a 10 Gb/s maximum bandwidth, and port 125-2 may have a 10 Gb/s maximum bandwidth. A third set of network ports 105-3 is switched (i.e., via switch 300) to a port 125-3 that is connected to a port 500-3 on line card 120. As shown, each of network ports 105-3 may have a 10 Gb/s maximum bandwidth, and port 125-3 may have a 10 Gb/s maximum bandwidth. A fourth set of network ports 105-4 is switched (i.e., via switch 300) to a port 125-4 that is connected to a port 500-4 on line card 120. As shown, each of network ports 105-4 may have a 10 Gb/s maximum bandwidth, and port 125-4 may have a 10 Gb/s maximum bandwidth. In the example of FIG. 5, network ports 105-1, 105-2, 105-3 and 105-4 may share the 10 Gb/s bandwidth of the respective ports 125-1, 125-2, 125-3 and 125-4. The 10 Gb/s bandwidth of the respective ports 125-1, 125-2, 125-3 and 125-4 may, therefore, be considered to be "oversubscribed" by network ports 105-1, 105-2, 105-3 and 105-4, and the available bandwidth to each of network ports 105-1, 105-2, 105-3 and 105-4 may be limited by the 10 Gb/s maximum bandwidth of the respective ports 125-1, 125-2, 125-3 and 125-4.

Figure 6:
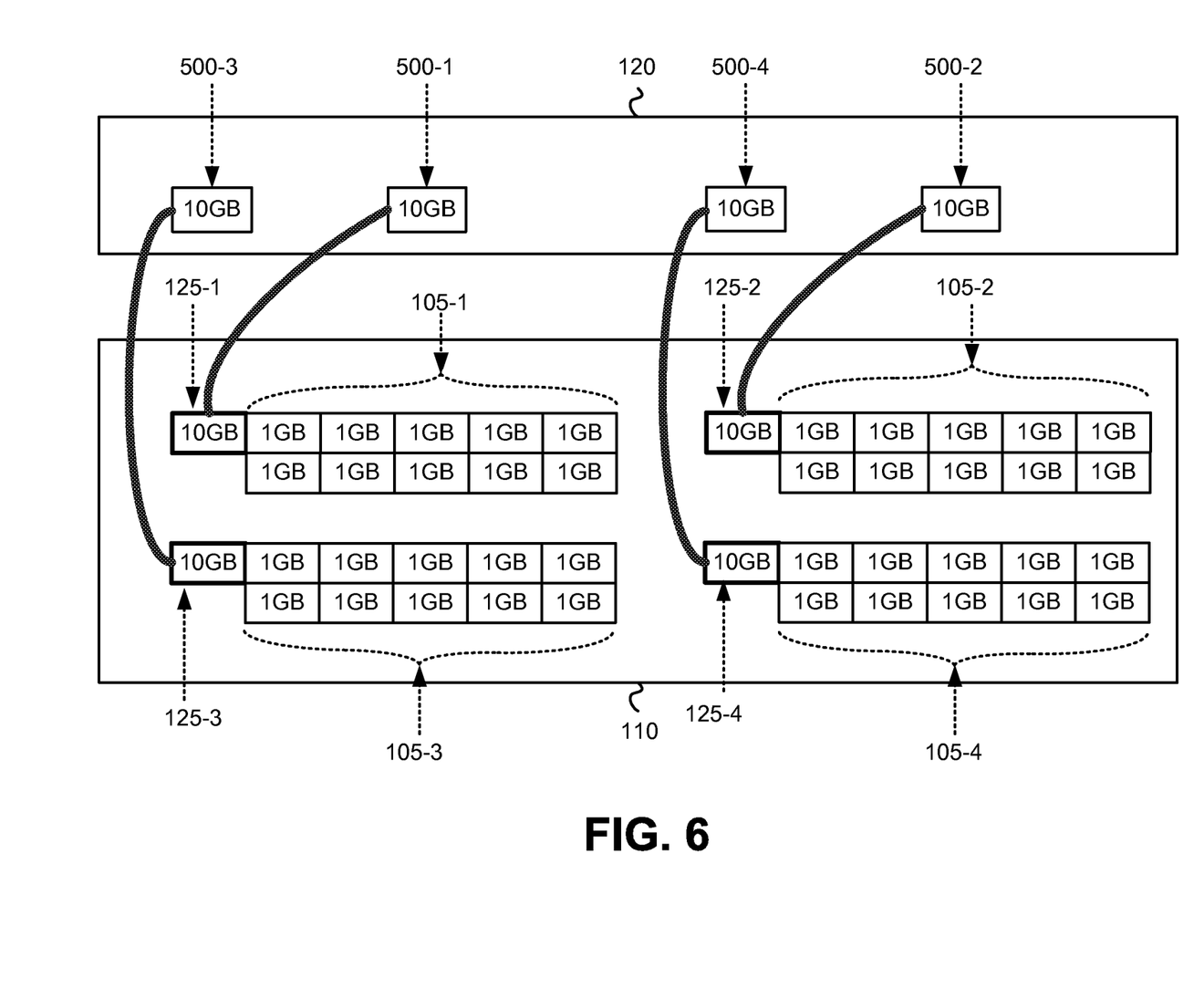
FIG. 6 is a diagram that depicts an example of four 10 Gigabit/second ports connecting to another line card with ten 1 Gigabit/second network ports being allocated to each of the four 10 Gigabit/second ports connected to the other line card.

FIG. 6 is a diagram that depicts another example of the switching of network ports 105 of bandwidth management card 110 through to ports 125 connected to another line card. In the example of FIG. 6, a first set of network ports 105-1 is switched (i.e., via switch 300) to a port 125-1 that is connected to a port 500-1 on a line card 120. As shown, each of network ports 105-1 may have a 1 Gb/s maximum bandwidth, and port 125-1 may have a 10 Gb/s maximum bandwidth. A second set of network ports 105-2 is switched (i.e., via switch 300) to a port 125-2 that is connected to a port 500-2 on line card 120. As shown, each of network ports 105-2 may have a 1 Gb/s maximum bandwidth, and port 125-2 may have a 10 Gb/s maximum bandwidth. A third set of network ports 105-3 is switched (i.e., via switch 300) to a port 125-3 that is connected to a port 500-3 on line card 120. As shown, each of network ports 105-3 may have a 1 Gb/s maximum bandwidth, and port 125-3 may have a 10 Gb/s maximum bandwidth. A fourth set of network ports 105-4 is switched (i.e., via switch 300) to a port 125-4 that is connected to a port 500-4 on line card 120. As shown, each of network ports 105-4 may have a 1 Gb/s maximum bandwidth, and port 125-4 may have a 10 Gb/s maximum bandwidth. In the example of FIG. 6, network ports 105-1, 105-2, 105-3 and 105-4 may use the 10 Gb/s maximum bandwidth of the respective ports 125-1, 125-2, 125-3 and 125-4. The 10 Gb/s bandwidth of the respective ports 125-1, 125-2, 125-3 and 125-4 may, therefore, be considered to be "fully subscribed" by network ports 105-1, 105-2, 105-3 and 105-4, and each of network ports 105-1, 105-2, 105-3 and 105-4 may operate at their maximum 1 Gb/s bandwidth.

Figure 7:
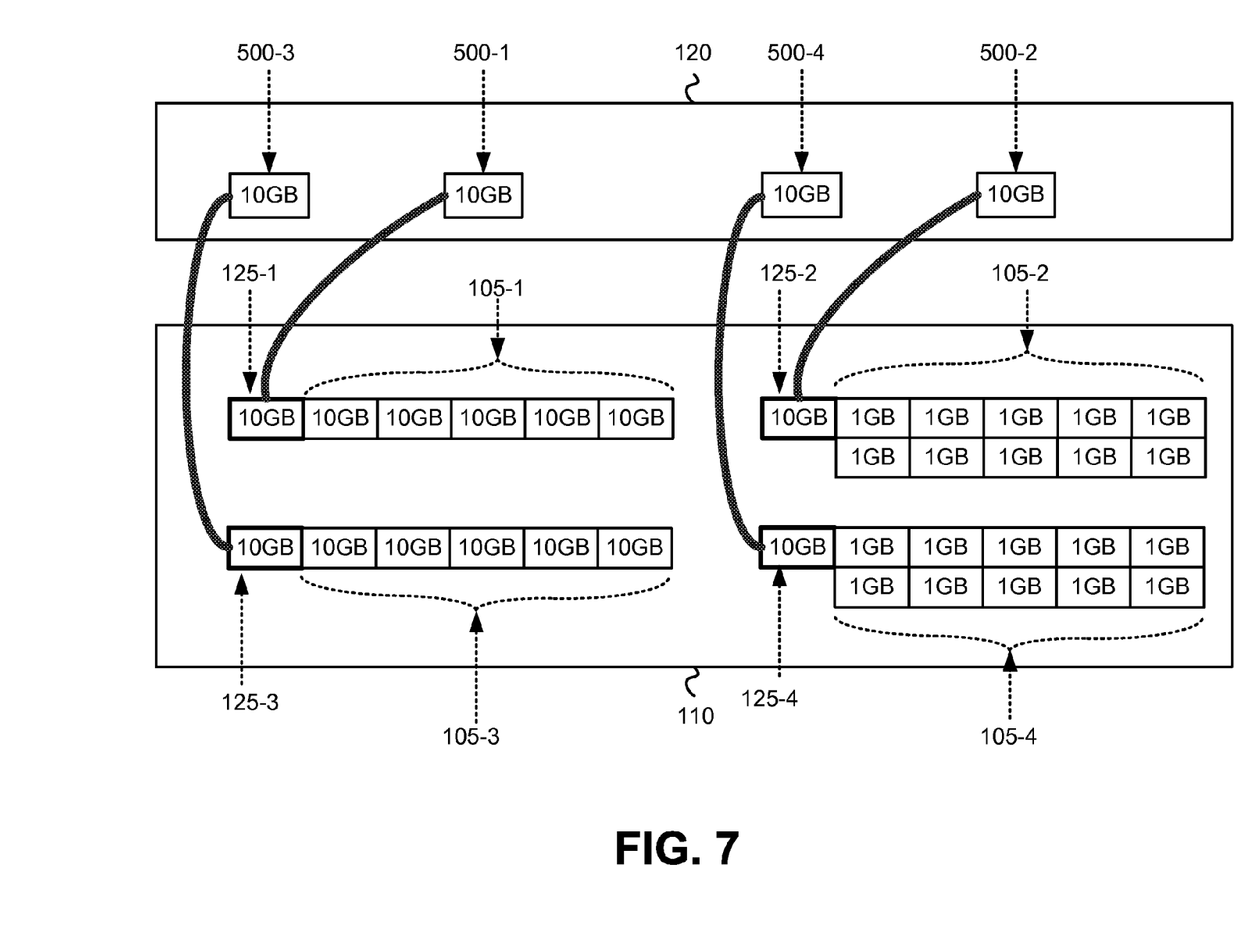
FIG. 7 is a diagram that depicts an example of four 10 Gigabit/second ports connecting to another line card with five 10 Gigabit/second network ports being allocated to two of the four 10 Gigabit/second ports connected to the other line card and ten 1 Gigabit/second ports being allocated to the other two of the four 10 Gigabit/second ports connected to the other line card.

FIG. 7 is a diagram that depicts another example of the switching of network ports 105 of bandwidth management card 110 through to ports 125 connected to another line card. In the example of FIG. 7, a first set of network ports 105-1 is switched (i.e., via switch 300) to a port 125-1 that is connected to a port 500-1 on a line card 120. As shown, each of network ports 105-1 may have a 10 Gb/s maximum bandwidth, and port 125-1 may have a 10 Gb/s maximum bandwidth. A second set of network ports 105-2 is switched (i.e., via switch 300) to a port 125-2 that is connected to a port 500-2 on line card 120. As shown, each of network ports 105-2 may have a 1 Gb/s maximum bandwidth, and port 125-2 may have a 10 Gb/s maximum bandwidth. A third set of network ports 105-3 is switched (i.e., via switch 300) to a port 125-3 that is connected to a port 500-3 on line card 120. As shown, each of network ports 105-3 may have a 10 Gb/s maximum bandwidth, and port 125-3 may have a 10 Gb/s maximum bandwidth. A fourth set of network ports 105-4 is switched (i.e., via switch 300) to a port 125-4 that is connected to a port 500-4 on line card 120. As shown, each of network ports 105-4 may have a 1 Gb/s maximum bandwidth, and port 125-4 may have a 10 Gb/s maximum bandwidth.

In the example of FIG. 7, network ports 105-1 and 105-3 may share the 10 Gb/s bandwidth of the respective ports 125-1 and 125-3. The 10 Gb/s bandwidth of the respective ports 125-1 and 125-3 may, therefore, be considered to be "oversubscribed" by network ports 105-1 and 105-3, and the available bandwidth to each of network ports 105-1 and 105-3 may be limited by the 10 Gb/s maximum bandwidth of the respective ports 125-1 and 125-3.

Additionally, network ports 105-2 and 105-4 may use the 10 Gb/s maximum bandwidth of the respective ports 125-2 and 125-4. The 10 Gb/s bandwidth of the respective ports 125-2 and 125-4 may, therefore, be considered to be "fully subscribed" by network ports 105-2 and 105-4, and each of network ports 105-2 and 105-4 may operate at their maximum 1 Gb/s bandwidth.

Exemplary Switching Configuration

Implementation Process

Figure 8:
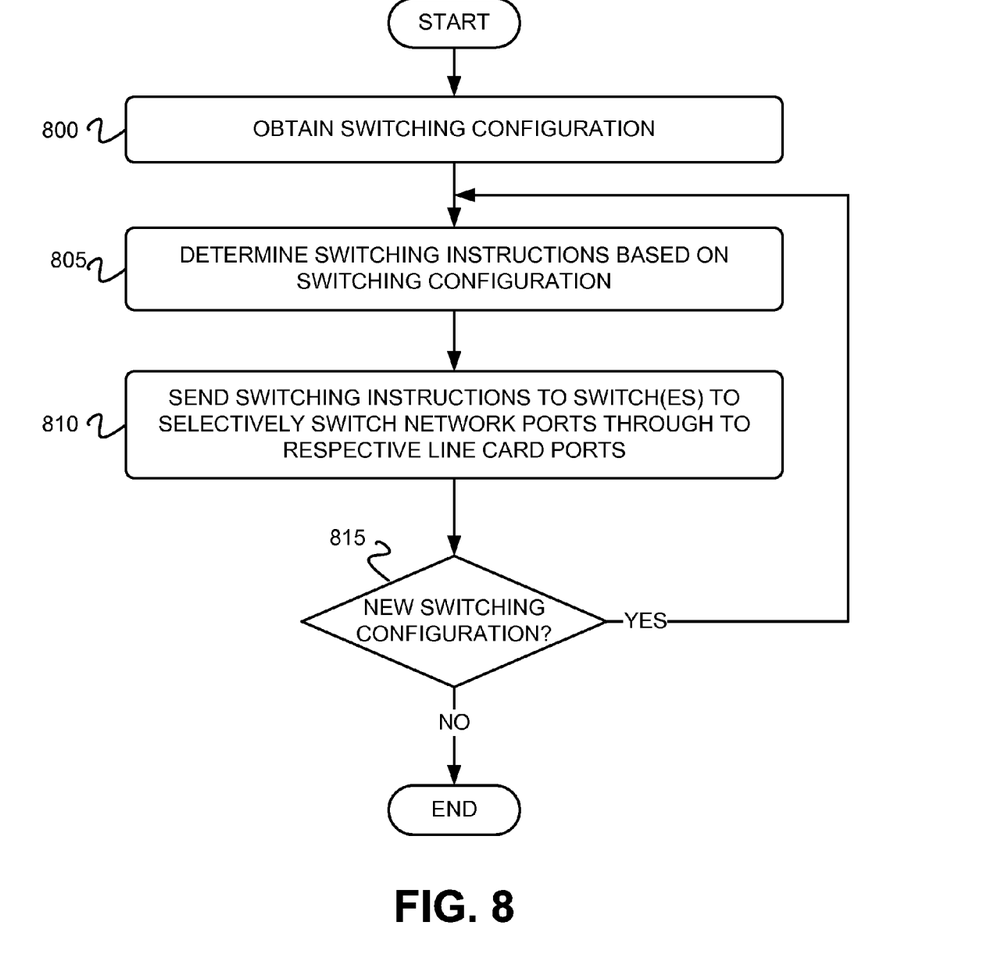
FIG. 8 is a flow chart that illustrates an exemplary process for selectively switching network ports of a bandwidth management card through to respective line card ports so as to allocate bandwidth for network links connected to each of the network ports.

FIG. 8 is a flow chart that illustrates an exemplary process for implementing a switching configuration in bandwidth management line card 110. The exemplary process of FIG. 8 may be implemented by switch control unit 200. In other embodiments, some or all of the blocks described below may be performed by another component(s) of network device 100, or by components not shown in FIG. 2 or 3.

The exemplary process may include obtaining a switching configuration (block 800). A specific switching configuration may be identified by switch control unit 200. The identified switching configuration may, for example, be identified from external input (e.g., user input). Switching instructions may be determined based on the obtained switching configuration (block 805). Switch control unit 200 may determine the necessary switching instructions to issue to switching units 210-1 through 210-X based on the identified switching configuration. The switching instructions may be sent to switch(es) 300 to selectively switch network ports 105 through to respective line card ports 125 (block 810). For example, referring to the example of FIG. 4, switch control unit 200 may send switching instructions to cause switch 300 to switch network ports 105-1 and 105-2 through to port 125-2. In this example, switch control unit 200 may further send switching instructions to cause switch 300 to switch network ports 105-3, 105-4 and 105-5 through to port 125-1. Switch control unit 200 may send the appropriate switching instructions to implement the identified switching configuration within bandwidth management line card 110.

It may be determined whether there is a new switching configuration (block 815). Switch control unit 200 may identify a new switching configuration (e.g, from external input) for bandwidth management line card 110. If there is a new switching configuration (block 815—YES), then the exemplary process may return to block 805 with the determination of new switching instructions to implement the new switching configuration. If there is no new switching configuration (block 815—NO), then the exemplary process may end.

CONCLUSION

As described herein, a bandwidth management line card, which may be connected between network links (i.e., connected to an external network(s)) and other line cards within a network device, may permit selective allocation of channel bandwidth to the network links. One or more switches of the bandwidth management line card may selectively switch a set of network ports through to a port, of multiple ports, that connect to other line cards. By this switching, bandwidth may be selectively allocated to the network links connected to the network ports.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While a series of blocks has been described in FIG. 8, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. An apparatus comprising:
a switch control unit; and
a first switch to:
receive first instructions from the switch control unit,
switch a first subset of a plurality of network ports through to a first port of a plurality of ports based on the received first instructions,
each of the plurality of network ports being connected to a network link to at least one external network, and
the plurality of ports being connected to one or more line cards associated with the apparatus, and
switch a second subset of the plurality of network ports through to a second port of the plurality of ports based on the received first instructions.

2. The apparatus of claim 1, where the switch control unit is to:
obtain a switching configuration for the apparatus, where the switching configuration allocates bandwidth to the first subset of the plurality of network ports and to the second subset of the plurality of network ports, and
determine the first instructions based on the switching configuration.

3. The apparatus of claim 1, where each of the plurality of network ports is connected to the first switch via an optical transceiver and a physical layer circuit.

4. The apparatus of claim 3, where the physical layer circuit processes data at a specified rate.

5. The apparatus of claim 4, where the specified rate comprises 10 Gigabits/second or 1 Gigabits/second.

6. The apparatus of claim 1, where the first port is associated with a first bandwidth, and
where, when the first switch switches the first subset of the plurality of network ports to the first port of the plurality of ports, the first switch allocates the first bandwidth to the first subset of the plurality of network ports.

7. The apparatus of claim 1, where the second port is associated with a second bandwidth, and
where, when the first switch switches the second subset of the plurality of network ports to the second port of the plurality of ports, the first switch allocates the second bandwidth to the second subset of the plurality of network ports.

8. The apparatus of claim 1, further comprising:
a second switch to:
receive second instructions from the switch control unit,
switch a third subset of the plurality of network ports through to a third port of the plurality of ports based on the received second instructions, and
switch a fourth subset of the plurality of network ports through to a fourth port of the plurality of ports based on the received second instructions.

9. The apparatus of claim 8, where the switch control unit is to:
obtain a switching configuration for the device that allocates bandwidth to the third subset of the plurality of network ports and to the fourth subset of the plurality of network ports, and
determine the second instructions based on the switching configuration.

10. The apparatus of claim 8, where the third port is associated with a third bandwidth, and
where, when the second switch switches the third subset of the plurality of network ports to the third port of the plurality of ports, the second switch allocates the third bandwidth to the third subset of the plurality of network ports.

11. The apparatus of claim 8, where the fourth port is associated with a fourth bandwidth, and
where, when the second switch switches the fourth subset of the plurality of network ports to the fourth port of the plurality of ports, the second switch allocates the fourth bandwidth to the fourth subset of the plurality of network ports.

12. The apparatus of claim 1, where the apparatus comprises a bandwidth management card in a network device that forwards data based on routing protocols.

13. The apparatus of claim 1, where the first switch switches data at a 10 Gigabits/second rate.

14. A method, comprising:
selecting, via a switch control unit, a first subset of a plurality of network ports associated with a bandwidth management card, the bandwidth management card being connected to one or more line cards, via a plurality of ports, for transferring data from the bandwidth management card;
selecting, via the switch control unit, a second subset of the plurality of network ports, the second subset of the plurality of network ports being different than the first subset of the plurality of network ports;
switching the selected first subset of the plurality of network ports through to a first port, of the plurality of ports, the first port being connected to a first line card, of the one or more lines cards, and the first subset of the plurality of network ports sharing available bandwidth associated with the first port; and
switching the selected second subset of the plurality of network ports through to a second port, of the plurality of ports, the second port being different than the first port and connected to a second line card, of the one or more line cards, the second subset of the plurality of network ports being different than the first subset of the plurality of network ports and sharing available bandwidth associated with the second port.

15. The method of claim 14, where the bandwidth management card, the first line card, and the second line card are included in a network device.

16. The method of claim 14, where the first subset of the plurality of network ports is to handle data at a first rate, and
where the second subset of the plurality of network ports is to handle data at a second rate.

17. The method of claim 16, where the first rate is different than the second rate.

18. The method of claim 14, where the first line card is a same card as the second line card.

19. A device comprising:
a control unit to:
obtain a switching configuration to transmit data, received at a plurality of network ports, from the device to one or more line cards via a plurality of ports of the device; and
a switch to, based on the obtained switching configuration, switch;
a first subset of the plurality of network ports through to a first port of the plurality of ports,
the first port being connected to a first line card of the one or more line cards,
the first subset of the plurality of network ports sharing available bandwidth associated with the first port, and a second subset of the plurality of network ports through to a second port of the plurality of ports,
the second port being connected to a second line card of the one or more line cards,
the second subset of the plurality of network ports being different than the first subset of the plurality of network ports and sharing available bandwidth associated with the second port.

20. The device of claim 19,
where, when switching the first subset of the plurality of network ports through to the first port of the plurality of ports, the switch is to:
allocate the available bandwidth associated with the first port to the first subset of the plurality of network ports.

* * * * *